March 9, 1943.  A. J. PENICK ET AL  2,313,169
WELL HEAD ASSEMBLY
Filed May 9, 1940
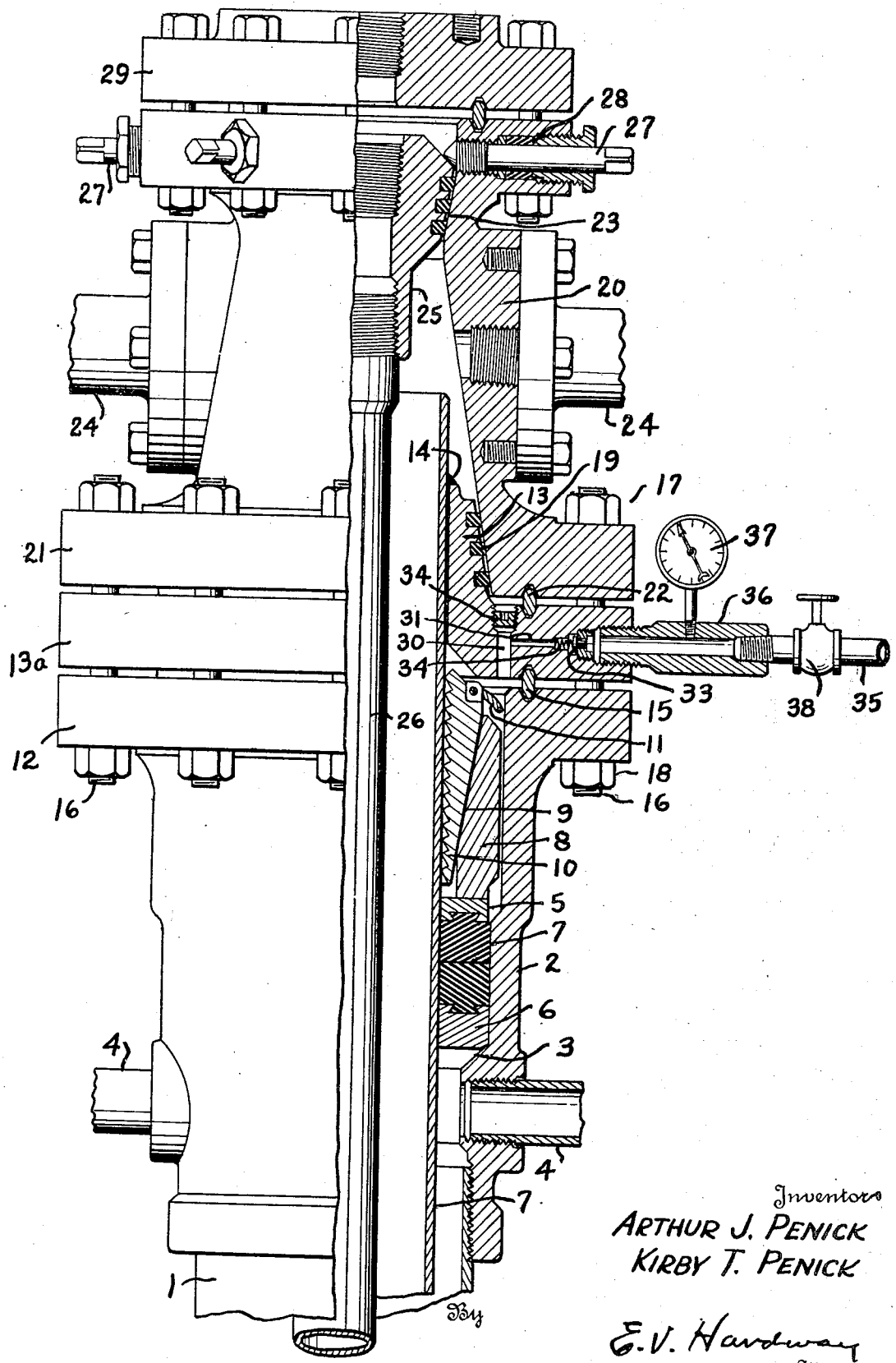
Inventors
ARTHUR J. PENICK
KIRBY T. PENICK
E. V. Hardway
Attorney Patented Mar. 9, 1943

2,313,169

UNITED STATES PATENT OFFICE 2,313,169

WELL HEAD ASSEMBLY

Arthur J. Penick and Kirby T. Penick, Houston, Tex.

Application May 9, 1940, Serial No. 334,137

1 Claim. (Cl. 166—14)

This invention relates to a well head assembly.

An object of the invention is to provide an assembly adapted to be mounted on a pipe in a well bore and equipped with means for controlling the flow of fluid from the well.

The assembly embodies a casing head mounted on an outer pipe with a tubing head thereon for supporting the tubing with sealing means arranged to shield the casing head from the high pressure fluid in the well so that the casing head can be made of relatively light construction and yet have sufficient strength to safely withstand the pressure to which it may be subjected.

It is another object of the invention to provide in a well head assembly a novel arrangement of seals for protecting the casing head against high pressures as well as for sealing between the tubing head and casing head.

The invention also embodies a novel arrangement for testing the seals embodied in the assembly.

With the above and other object in view the invention has particular relation to certain novel features of construction, arrangement of parts and use an example of which is given in this specification and illustrated in the accompanying drawing, wherein:

The figure shows a side elevation of the assembly shown partly in section.

Referring now more particularly to the drawing the numeral 1 designates an outer casing in a well attached to the upper end of which there is a casing head 2 which is formed with an inside seat 3 and which is provided with outflow lines 4 beneath said seat.

On the seat 3 there is a packing assembly formed of upper and lower wear rings 5, 6 with the seal rings 7 between them all forming a surrounding seal between the casing head and an inner well pipe 7a.

Supported on this packing assembly there is a slip adapter 8 having an inside downwardly converging seat 9 in which there is located a series of downwardly tapering wedge shaped slips as 10 whose inner sides are toothed to engage and support the inner pipe 7a. Each slip 10 is provided with a grip member 11 by means of which it may be handled.

The upper end of this casing head 2 is formed with an external annular flange 12.

Supported on the upper end of the casing head there is a tubing head adapter 13 which is tapered inwardly, externally and which surrounds the inner pipe 7a and whose upper end is welded to said inner pipe all the way around at 14. The tubing head adapter is formed, at its lower end, with an external annular flange 13a which registers with the flange 12. The facing sides of these registering flanges having registering annular grooves in which the annular gasket 15 is seated thus forming a fluid tight seal between them.

Bolts as 16 are threaded through the flange 13a and extend each way beyond said flange. The ends of these bolts are threaded to receive the upper and lower nuts 17, 18.

The tubing head adapter 13 has external annular seal rings 19 countersunk therein as shown and extending outwardly slightly beyond the outer surface of said adapter.

The numeral 20 designates a tubing head which, as shown is internally flared downwardly and which is, when assembled, seated on the adapter 13 and is sealed in relation therewith by the seal rings 19. The tubing head has an external annular flange 21 at its lower end with registers with the flanges 12 and 13a. When the head is assembled the bolts 16 extend through the flanges 12 and 21 and said flanges are secured in assembled relation by the upper and lower nuts 17, 18. The facing sides of the flanges 13a, 21 have registering grooves to receive the seal ring 22 which forms a fluid tight seal between them.

The upper end of the tubing head has the downwardly converging seat 23 and beneath said seat has the outflow lines 24, 24. On the seat 23 and in sealing engagement therewith there is a tubular hanger 35 which supports the well tubing 26 in the well. The tubing hanger is secured on its seat by the radial lock down bolts 27 which have threaded engagement with the tubing head and whose inner ends are tapered to engage the downwardly and outwardly tapered upper end of the hanger as shown. The lock down bolts 27 are surrounded by suitable stuffing boxes 28.

Bolted onto the upper end of the tubing head there is an annular flange 29 on which a Christmas tree or other well head equipment may be located.

In assembling the head the packing unit 5, 6, 7 should first be located around the inner pipe 7a in the casing head with the adapter 8 and the slips 10 thereon in engagement with the inner pipe 7a and the tubing head adapter should then be located and secured in place and welded to the inner pipe 7 by the weld 14. However before the tubing head is mounted on the assembly the seals between the casing head and tubing head adapter and the inner pipe 7a should be tested for leakage. For this purpose the flange 13a is provided with a vertical bore 30 and a radial bore 31 leading outwardly from said vertical bore. The outer end of the radial bore is enlarged and internally threaded and a valve seat 32 is screwed therein which is controlled by an inwardly opening back pressure valve 33 normally held seated by a coil spring 34. Before the tubing head is mounted in place the space within the casing head and above the packing 5, 6, 7 may be filled with water through the bore 30 and said bore than closed by the plug 34 which should be welded in place so as to form a complete seal. A pressure line 35 may then be connected to the outer end to the bore 31 by means of a nipple 36 which is equipped with a pressure gage 37. The water filling said space within the casing head may then be placed under pressure and the valve 38, with which the line 35 is equipped, should then be closed. If the pressure is maintained as indicated by the gage 37 it will be evidence that the seals are not leaking but if the gage 37 indicates a pressure drop it will indicate also that the seals are defective. If the seals are effective the tubing head may then be mounted and secured in place and the pressure of the high pressure fluid through the inner pipe 7a to which the tubing head is subjected will be shielded from the casing head 2 so that with an assembly of this type a casing head of relatively light construction can safely be used.

When the assembly has been completed the nipple 36 may be detached.

The drawing and description are illustrative merely while the broad principle of the invention will be defined by the appended claim.

What we claim is:

A well head assembly comprising upper and lower tubular heads, an adapter on the lower head shaped to surround an inner pipe and to space the inner pipe from the lower head, seals between the adapter and the upper and lower heads said adapter having an external, upwardly converging seat and forming a seal with said inner pipe, said upper head fitting over, and forming a fluid tight seal with, said seat, sealing means within the lower head around said inner pipe and enclosing the space between the inner pipe and the lower head, said space being provided to contain a substantially non-compressible medium effective to test said seals when subjected to pressure.

ARTHUR J. PENICK.
KIRBY T. PENICK.